3,457,249
OLEFIN POLYMERIZATION AND RECOVERY
Robert A. Hinton, Bartlesville, Okla., assignor to Phillips
Petroleum Company, a corporation of Delaware
Filed Dec. 28, 1964, Ser. No. 421,231
Int. Cl. C08f 1/88, 1/66
U.S. Cl. 260—93.7                                    4 Claims

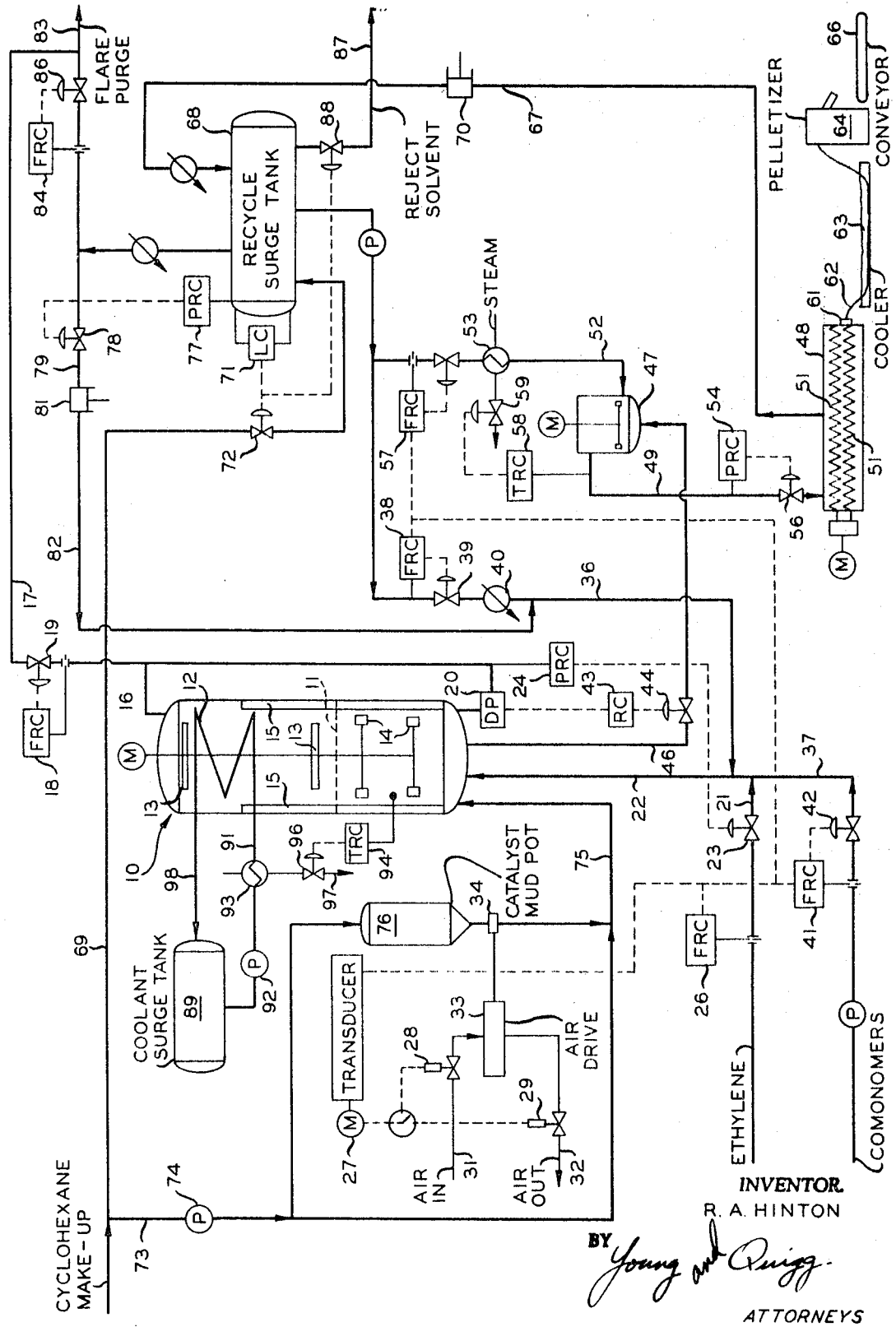

ABSTRACT OF THE DISCLOSURE

Effluent from an olefin polymerization reactor is heated to a high temperature, for instance by adding an additional amount of very hot solvent. It is then added directly to a vented extruder. Because of the heat added to the effluent, the effluent has sufficient enthalpy to insure that substantially complete vaporization of the solvent occurs in the extruder leaving molten polymer which can be worked by the extruder.

---

This invention relates to the polymerization and recovery of normally soild olefin polymers. In a further aspect, the invention relates to an apparatus for carrying out the polymerization and polymer recovery.

The present invention is an improvement upon the basic polymerization process disclosed in U.S. Patent 2,825,721 (1958) of Hogan and Banks. In one method of operation according to the process of that patent, the so-called "high-solids" reactor is ued. These are reactors in which the polymer solution contains a high (at least 20 weight percent) concentration of polymer in the solvent. Various reactors have been devised for this high solids system. One of the better reactors is the boiling tower reactor operated with a vapor-liquid interface. This reactor is used in combination with a new polymer recovery system.

An object of this invention is to provide an improved process and arrangement of apparatus for the solution polymerization of olefins. A further object is to provide an improved system for recovery of the polymer from the reaction zone effluent. Other objects and advantages of the invention will be apparent to those skilled in the art, upon reading this disclosure which includes A drawing showing in schematic form apparatus suitable for carrying out the process of the invention.

In one aspect the invention resides in a process for recovering solid polymer from a solution thereof by working the solution in a closed, vented extrusion zone, the improvement comprising passing the solution into the extrusion zone with sufficient enthalpy to ensure substantially complete vaporization of solvent in said extrusion zone leaving molten polymer therein.

The complete system provides a solution polymerization process for producing a normally solid polymer which comprises feeding a polymerizable monomer into a reaction zone, feeding into said reaction zone a solvent for said polymer and said monomer, feeding a catalyst to said reaction zone, passing a liquid effluent stream from said reaction zone to a mixing zone, adding hot solvent to said mixing zone, and passing the effluent from said mixing zone to a vented extrusion zone, the enthalpy of said hot solvent being sufficient to provide the mixer effluent with sufficient enthalpy to ensure substantially complete vaporization of solvent in said extrusion zone leaving molten polymer therein.

The drawing illustrates the invention.

The reactor 10 is a "boiling" unit which is operated with a vapor-liquid interface 11. A condenser consisting of finned tubing coils 12 is provided in the vapor phase of the reactor 10. Reactor temperature is maintained by varying the temperature of coolant circulating through the condenser. The reactor contents are agitated by fans 13 in the vapor phase and by turbines 14 in the liquid phase. The purpose of the agitators 13 and 14 is to mix the solution phase and assure turbulence in the vapor phase. The fan 13 below the tubing bundle should also promote disengagement of liquid from vapor as it leaves the solution interface 11. The reactor 10 is also provided with baffles 15. A purge stream from the vapor phase is sent by lines 16 and 17 to flare to prevent excessive build-up of noncondensables such as nitrogen, butane, etc. Flow recorder-controller 18 operatively connected to valve 19 in line 17 controls this flare line flow. The reactor pressure, measured by pressure-recorder-controller 24, is maintained by throttling the flow of high pressure ethylene to the reactor thru lines 21 and 22 with the valve 23 in line 21, valve 23 being operatively connected to pressure-recorder-controller 24. A flow-recorder-controller 26 on the ethylene feed stream 21 monitors the ethylene feed to the reactor; a signal from the instrument 26 resets the speed of a variable speed motor 27 which controls the cycle frequency of solenoids 28 and 29 controlling air flow (lines 31 and 32) to the driver 33 on the ball-check catalyst feeder valve 34. The flow of the ethylene to the reactor thus controls the rate of catalyst charge and is, in turn, controlled directly by the reactor pressure. The rates of solvent (line 36) and any comonomer charges (line 37) to the reactor 10 are controlled directly by flow recorder-controllers. Specifically controller 38 operatively connected to valve 39 controls flow through line 36 and controller 41 controls flow through line 37 by valve 42. Precooler 40 cools recycle solvent before it is returned to reactor 10. A signal from the flow recorder-controller 26 on the ethylene feed stream 21 is used to reset the set points on the solvent flow recorder controller 38 and comonomer flow-recorder controller 41. It is thus possible to maintain a constant solvent/monomer ratio and monomer/monomer ratio regardless of fluctuations in reaction rate. The residence time in the reactor is varied by changing the set point on the ethylene flow-recorder-controller 26. The reactor liquid level is maintained by differential pressure transmitter 20 operatively connected to recorder-controller 43 system which throttles, by valve 44, the flow of solution through line 46 from the reactor 10 to a mixer 47.

The polymer is recovered in a vented extruder 48 of the type adapted for the evaporation of volatile constituents from plastic materials. Such extruders are known in the art. The polymer solution is flashed by line 49 into the devolatilizing unit 48 with sufficient enthalpy (energy) to facilitate complete vaporization of hydrocarbon leaving a molten mass of polymer above its crystallization temperature. The screws 51 of the devolatilizer 48 work the polymer to promote near equilibrium mass transfer. The energy for the flash is provided by heating recycle solvent, supplied by line 52 having heater 53 therein, to relatively high temperature and mixing with the reactor effluent in mixer 47 just below the valve 44 maintaining liquid level in the reactor 10. A pressure-recorder-controller 54, operatively connected to valve 56, maintains pressure on the mixer 47 somewhat below reactor operating pressure by controlling valve 56 which throttles the solution feed to the devolatilizing unit 48. The flow rate of recycle solvent to mixer 47 is controlled by a flow-recorder-controller 57; the set point of the flow recorder controller 57 is reset by the ethylene flow-recorder-controller 26 which will thus allow maintenance of a constant solids concentration in the feed to the devolatilizing unit 48. The enthalpy of the feed to the devolatilizing unit 48 is maintained by a temperature-recorder-controller 58, operatively connected to valve 59, which throttles flow of steam to the preheater 53 in the recycle solvent line 52 to the mixer 47.

The screws 51 in the devolatilizer 48 force the polymer effluent through a die 61; thus forming strands of polymer 62. The polymer is cooled below its crystallization temperature in a water bath 63. A pelletizer 64 chops the strands. A conveyor 66 moves pellets to storage.

The flash overhead from the devolatilizer 48, recovered through line 67, having gas compressor or blower 70 therein, is partially condensed into a surge tank 68. The surge tank 68 serves as a source of recycle solvent to mixer 47 and solvent feed to the reactor through line 36. The liquid level in the tank 68 is maintained by throttling the flow of fresh make-up solvent into the system through line 69 by liquid level controller 71 operatively connected to valve 72. A small slipstream of the fresh solvent is pumped through line 73 by metering pump 74 to the catalyst feeder 76 to serve as a carrier for catalyst feed to the reactor 10 by line 75. Normally, this slipstream supplies sufficient solvent and there is no flow in line 69. The pressure on the recycle surge tank 68 is maintained by throttling the flow of recycle ethylene by means of pressure-recorder-controller 77 operatively connected to valve 78 in line 79 to compressor 81 which pumps it back to reactor 10 through line 82 and 36. A purge stream to flare from the recycle surge tank (line 83) is throttled with a flow-recorder-controller 84 operatively connected to valve 86. To prevent build-up of impurities a small amount of solvent is continuously removed from the system through line 87. Flow is controlled by liquid level controller 71 operatively connected to valve 88.

Finned tubing coils 12 are supplied from coolant surge tank 89 by line 91 having pump 92 and cooler 93 therein. Flow of cooling water to cooler 93 is controlled by temperature-recorder-controller 94 which measures the temperature in reactor 10 and is operatively connected to valve 96 in the cooling water line 97. Coolant is returned to surge tank 89 by line 98.

The catalyst used is a highly active powdered catalyst having a maximum particle size of 100 microns, 50 percent thereof being below 10 microns in size, and consisting essentially of chromium oxide deposited on silica, alumina, zirconia, or thoria, at least a portion of the chromium being hexavalent in form at the initial contacting with the olefin. Silica and silica-alumina mixtures are preferred. The chromium oxide in the catalyst is in the range of 1.5 to 10 weight percent.

The invention is particularly applicable to the polymerization of aliphatic 1-olefins having 2 to 8 carbon atoms per molecule and no chain branching nearer the double bond than the 4-position. Some examples are ethylene, propylene, 1-butene, 1-pentene, 1-hexene, 1-octene, 4-methyl-1-pentene, and 1,3-butadiene. Homopolymers and copolymers can be made by this process.

Further details of the catalyst prepration, its activation, and the polymerization are set forth in the aforesaid Hogan and Banks patent.

The following example sets forth a specific embodiment of the process. It should not be considered unduly limiting.

Example

Using the system shown in the drawing, ethylene is polymerized in a 10,000 gallon reactor with an $L/D$ ratio of 2.5. The solution volume is 5,500 gallons with a solution residence time of 2 hours. Operating the reactor at 300° F. and 500 p.s.i.g., the viscosity of the reaction zone solution is 10,000 centipoises. The recycle surge tank is operated at 75 p.s.i.g. and 290° F. The condenser load is 56,000 B.t.u./min. with a condensate reflux rate of 446 lb./min. and a condensate composition of 4.94 weight percent ethylene. Details are shown in the following table.

BOILING REACTOR

| Stream No. | Pressure (p.s.i.g.) | Temperature (°F.) | Polymer (lb./min.) | Cyclohexane (lb./min.) | (lb./min.) | Catalyst (lb./min.) | Noncondensable (lb./min.) |
|---|---|---|---|---|---|---|---|
| 73 | 100 | 80 | | 0.50 | | | |
| 21 | 550 | 50 | | | | 50.3 | 0.10 |
| 75 | 500 | 70 | | 0.50 | | 0.015 | |
| 83 | 75 | | | | | | |
| 22 | 500 | 135 | | 199.6 | 60.7 | | 0.117 |
| 46 | 500 | 300 | 50 | 200 | 10.4 | 0.015 | 0.017 |
| 52 | 450 | 630 | | 400 | 0.25 | | |
| 49 | 450 | 520 | 50 | 600 | 10.65 | 0.015 | 0.017 |
| 67 | 1 | 300 | | 599.9 | 10.65 | | 0.017 |
| 66 | | | 50 | 0.10 | | 0.015 | |
| 16 | | 300 | | 0.10 | 0.30 | | 0.10 |
| 79 | 72 | 150 | | 5.4 | 10.28 | | 0.017 |
| 69 | | | | | | | |
| 36 | 500 | 150 | | 199.6 | 10.4 | | |
| 91 | 600 | 180 | | 5,630 | | | |
| 98 | 550 | 200 | | 5,630 | | | |
| 87 | | 290 | | 0.30 | | | |

As many possible embodiments can be made of this invention without departing from the scope thereof, it is to be understood that all matter herein set forth is to be interpreted as illustrative and not as unduly limiting the invention.

I claim:

1. A solution polymerization process for producing a normally solid polymer which comprises feeding a polymerizable monomer into a reaction zone, feeding into said reaction zone a solvent for said polymer and said monomer, feeding a catalyst to said reaction zone, passing a liquid effluent stream comprising solvent and polymer from said reaction zone to a mixing zone, adding hot solvent to said mixing zone, and passing the effluent from said mixing zone to a vented extrusion zone, the enthalpy of said hot solvent being sufficient to provide the mixer effluent with sufficient enthalpy to ensure substantially complete vaporization of solvent in said extrusion zone leaving molten polymer therein, working said polymer in said extrusion zone and thereafter recovering substantially solvent-free molten polymer from said extrusion zone.

2. A solution process for producing normally solid olefin polymer which comprises feeding an aliphatic 1-olefin having from 2 to 8 carbon atoms per molecule and no chain branching nearer the double bond than the 4-position into a reaction zone operated at a predetermined temperature and pressure, maintaining said pressure by controlling flow of olefin to said reaction zone, feeding into said reaction zone a hydrocarbon solvent for said polymer and said olefin, feeding into said zone finely divided catalyst consisting essentially of chromium oxide associated with at least one oxide selected from the group consisting of silica, alumina, zirconia, and thoria, at least a portion of the chromium being in the hexavalent state at the initial contacting of hydrocarbons and catalyst, the amount of solvent and catalyst feed being directly controlled in response to changes in olefin feed, passing a liquid effluent stream comprising solvent and polymer from said reaction zone to a mixing zone, controlling flow of said effluent to maintain a constant liquid level in said reaction zone, passing hydrocarbon solvent to said mixing zone in an amount directly controlled in response to changes in olefin feed, passing the mixture effluent to a vented extrusion zone, controlling the temperature of the solvent supplied to said mixing zone in response to changes in temperature of mixer effluent, the enthalpy of said solvent being sufficient to provide the mixer effluent with sufficient enthalpy to ensure substantially complete vaporization of solvent in said extrusion zone leaving molten polymer therein, working said polymer in said extrusion zone and thereafter recovering substantially solvent-free molten polymer from said extrusion zone.

3. A process for recovering solid polymer comprising: passing a solution of said polymer into a vented extrusion zone with sufficient enthalpy to ensure substantially complete vaporization of said solvent in said extrusion zone, leaving molten polymer therein, working said polymer in said extrusion zone and thereafter recovering substantially solvent-free molten polymer from said extrusion zone.

4. A method according to claim 3 wherein said enthalpy is provided by adding heated solvent to said solution.

References Cited

UNITED STATES PATENTS

| | | | |
|---|---|---|---|
| 2,894,824 | 7/1959 | Lanning | 260—94.9 |
| 3,072,626 | 1/1963 | Cines | 260—94.9 |

JAMES A. SEIDLECK, Primary Examiner

U.S. Cl. X.R.

260—94.2, 94.9